United States Patent
Hirano

(10) Patent No.: US 8,282,900 B2
(45) Date of Patent: Oct. 9, 2012

(54) AGENT FOR RENDERING HALOGEN-CONTAINING GAS HARMLESS, AND METHOD OF RENDERING HALOGEN-CONTAINING GAS HARMLESS USING SAME

(75) Inventor: Shigeru Hirano, Shunan (JP)

(73) Assignee: Tosoh Corporation, Shunan-shi (JP)

( * ) Notice: Subject to any disclaimer, the term of this patent is extended or adjusted under 35 U.S.C. 154(b) by 101 days.

(21) Appl. No.: 12/071,394

(22) Filed: Feb. 20, 2008

(65) Prior Publication Data

US 2008/0241035 A1  Oct. 2, 2008

(30) Foreign Application Priority Data

Feb. 21, 2007 (JP) ................... 2007-040876
Nov. 28, 2007 (JP) ................... 2007-307023

(51) Int. Cl.
*B01D 53/68* (2006.01)
*B01J 29/08* (2006.01)

(52) U.S. Cl. ..................... 423/240 R; 502/79
(58) Field of Classification Search .............. 423/240 R; 502/79; 95/131, 132; *B01J 20/18, 21/00*
See application file for complete search history.

(56) References Cited

U.S. PATENT DOCUMENTS

| | | | | |
|---|---|---|---|---|
| 4,876,411 A | * | 10/1989 | Bowes et al. | 585/533 |
| 6,183,539 B1 | * | 2/2001 | Rode et al. | 95/117 |
| 2001/0045160 A1 | * | 11/2001 | Hirano et al. | 95/96 |
| 2004/0231705 A1 | * | 11/2004 | Moriyama et al. | 134/26 |
| 2007/0037697 A1 | * | 2/2007 | DiMascio | 502/232 |

FOREIGN PATENT DOCUMENTS

| | | | |
|---|---|---|---|
| DE | 4113597 | * | 10/1991 |
| EP | 0516850 | * | 12/1992 |
| EP | 0 826 631 A1 | | 3/1998 |
| EP | 0 940 174 A2 | | 9/1999 |
| EP | 14 103 525 A1 | | 5/2001 |
| EP | 1 566 210 A1 | | 8/2005 |
| JP | 2-56242 | | 2/1990 |
| JP | 5-163015 | | 6/1993 |

* cited by examiner

*Primary Examiner* — Jessica L Ward
*Assistant Examiner* — Alexander Polyansky
(74) *Attorney, Agent, or Firm* — Foley & Lardner LLP

(57) ABSTRACT

An agent for rendering harmless a halogen-containing gas such as a halogen-containing exhaust gas, which comprises a faujasite zeolite having a $SiO_2/Al_2O_3$ ratio of 2.0 to 2.3 and containing at least one cation selected from alkali metal cations and alkaline earth metal cations. The cation is preferably selected from Na and K, and, more preferably, the cation comprises at least 70 mol % of Na and not larger than 30 mol % of K. The agent is used in the form of a molded body made using a binder.

6 Claims, No Drawings

AGENT FOR RENDERING HALOGEN-CONTAINING GAS HARMLESS, AND METHOD OF RENDERING HALOGEN-CONTAINING GAS HARMLESS USING SAME

BACKGROUND OF THE INVENTION (1) Field of the Invention

This invention relates to an agent for rendering harmless a halogen-containing gas such as a halogen-containing exhaust gas from, for example, an etching step in the process of producing a semiconductor device or a liquid crystal device, a CVD (chemical vapor deposition) process, and a cleaning process; and a method of rendering a halogen-containing gas harmless using the agent.

(2) Description of the Related Art

As a method of rendering harmless a halogen-containing gas such as a halogen-containing exhaust gas from, for example, an etching step in the process of producing a semiconductor device or a liquid crystal, a CVD (chemical vapor deposition) process, and a cleaning process, a thermal decomposition method, a wet method and a dry method are well-known.

The thermal decomposition method involves thermal decomposition of the above-mentioned exhaust gas by heating or burning the gas. The thermal decomposition method has problems such that a high temperature heating or burning is difficult to adopt in the case where a combustible gas is used, for example, in the process of producing semiconductor devices, and, in the case where the thermally decomposed gas is treated with water, a problem of waste water treatment is caused.

The wet method involves absorption of the exhaust gas with water or an aqueous alkali solution such as an aqueous sodium hydroxide solution. In the case when an aqueous alkali solution is used for absorbing the exhaust gas, problems arise in that semiconductor wafers are liable to be contaminated with an alkali, or a solid matter produced by the reaction of the aqueous alkali solution with a halogen-containing gas tends to clog the exhaust line of a treating apparatus. In the case when water is used for absorbing the exhaust gas, washing water is usually reused to reduce the amount of waste water, and consequently, the efficiency of the exhaust gas with water is rather low.

The dry method involves a treatment of the exhaust gas with a solid agent for rendering the exhaust gas harmless. The drying method is simple, and the problems encountered in the thermal decomposition method and the wet methods can be solved, and therefore, the dry method is widely used. As the agent for rendering the halogen-containing exhaust gas harmless, an agent comprising a salient amount of activated carbon has been heretofore widely used. However, there is a possibility that activated carbon violently absorbs and/or reacts with halogen-containing gases, which is accompanied, although rarely, by ignition or explosion due to exothermic reaction.

To resolve the problem encountered by activated carbon, zeolite which is incombustible has been proposed as an agent for rendering the halogen-containing exhaust gas harmless. Zeolite includes various types having different crystalline structures, and various compositions and pore diameters. Many proposals have been made as to the agent comprising zeolite and a method of rendering a halogen-containing compound harmless using the zeolite-comprising agent.

For example, Japanese Unexamined Patent Publication (hereinafter referred to as "JP-A") No. S62-289222 discloses a method of rendering a halogen-containing gas harmless by using an agent comprising soda lime, combined with alumina and/or zeolite. JP-A H06-47233 discloses a method of rendering a halogen-containing exhaust gas harmless by bringing the halogen-containing gas into contact with zeolite having an average pore diameter of at least 9 Å. JP-A 2001-338910 discloses a method of rendering a halogen-containing gas harmless, which comprises contacting a halogen-containing gas with an agent comprising iron oxide, an alkaline earth metal compound and activated carbon, followed by contacting with zeolite such as X-type zeolite or faujasite-type zeolite. JP-A 2004-181300 discloses a method of treating an oxidative gas or an acid gas with an agent comprising an alkaline earth metal compound, an alkali metal compound, zeolite and a carbonaceous material. As the zeolite, MS-5A (CaA-type zeolite) and MS-13X (NaX-type zeolite) are mentioned. WO2003/033115 discloses a method of removing a halogen-containing gas by contacting the halogen-containing gas with granules comprising a solid base, a carbonaceous material, and a porous material comprised of an inorganic oxide. The inorganic oxide includes silica gel and/or zeolite such as A-type zeolite.

Thus, MS-5A (CaA-type zeolite) and MS-13X (NaX-type zeolite) are known as active ingredients for rendering a halogen-containing gas harmless. However, their capacities of rendering a halogen-containing gas harmless are not sufficiently desired.

As another zeolite, X-type zeolite comprising Na-LSX zeolite and a binder has been proposed as a gas-purifying molecular sieve absorbent in JP-A 2002-519188. However, this patent document specifically discloses on purification by adsorptive removal of only carbon dioxide gas.

SUMMARY OF THE INVENTION

A primary object of the present invention is to provide a zeolite-comprising agent capable of rendering a halogen-containing gas harmless with an enhanced efficiency.

Another object is to provide a method for rendering a halogen-containing gas harmless with an enhanced efficiency, using a zeolite-comprising agent.

In accordance with the present invention, there is provided an agent for rendering a halogen-containing gas harmless, which comprises a faujasite zeolite having a $SiO_2/Al_2O_3$ ratio in the range of 2.0 to 2.3 and containing at least one cation selected from the group consisting of alkali metal cations and alkaline earth metal cations.

In accordance with the present invention, there is further provided a method of rendering a halogen-containing gas harmless, which comprises contacting a halogen-containing gas with the above-mentioned agent for rendering a halogen-containing gas harmless.

DETAILED DESCRIPTION OF THE INVENTION

The zeolite-comprising agent for rendering a halogen-containing gas harmless (which agent is hereinafter referred to as "harm-removing agent" when appropriate), and the method of rendering a halogen-containing gas harmless using the harm-removing agent, according to the present invention, will be described in detail.

The halogen-containing gas-removing agent according to the present invention comprises a faujasite zeolite having a $SiO_2/Al_2O_3$ ratio in the range of 2.0 to 2.3 by mole and containing at least one cation selected from the group consisting of alkali metal cations and alkaline earth metal cations.

The faujasite zeolite as used in the present invention has a $SiO_2/Al_2O_3$ ratio of 2.0 to 2.3 by mole, preferably 2.0 to 2.2 by mole and more preferably 2.0 to 2.1 by mole.

The faujasite zeolite as used in the present invention is a faujasite zeolite having a low $SiO_2/Al_2O_3$ ratio (which is generally called as low silica X-zeolite or LSX-zeolite). This faujasite zeolite exhibits a greatly enhanced capacity for rendering a halogen-containing gas harmless, which is unexpected from the large stoichiometric amount of cations in the zeolite.

The faujasite zeolite as used in the present invention contains at least one cation selected from alkali metal cations and alkaline earth metal cations. The faujasite zeolite preferably comprises Na and/or K, more preferably at least 70% by mole of Na and not larger than 30% by weight of K based on the total amount of cations.

The halogen-removing agent according to the present invention is preferably used as a molded body made by molding a mixture of the halogen-removing agent with a binder. The harm-removing agent used is preferably prepared by rendering binderless a binder material such as a clay mineral, silica or alumina to convert the binder material to a zeolite for giving a harm-removing agent exhibiting enhanced capacity of rendering a halogen-containing gas harmless. The harm-removing agent prepared by rendering the binder binderless preferably contains not larger than 10% by weight of unconverted binder, and most preferably it does not contain unconverted binder.

A zeolite powder has a particle diameter of a micron order, and thus, it is widely used in the form of a molded body for the use as an adsorbent. The zeolite powder does not exhibit self-bondability, and therefore, the molded body is made from a mixture of the zeolite powder with a binder.

As specific examples of the binder, there can be mentioned clay minerals such as kaolin, attapulgite, sepiolite and montmorillonite, silica and alumina. These binders exhibit very poor adsorption and thus the adsorption capacity decreases with the amount of binder. Therefore, the harm-removing agent of the present invention is preferably subjected to a treatment for rendering the binder binderless (which treatment is usually referred to as "binderless treatment") whereby the binder is converted to a zeolite crystal for enhancing the adsorption capacity.

The harm-removing agent of the present invention is characterized as exhibiting an enhanced adsorption of a halogen-containing gas due to faujasite zeolite having a lower $SiO_2/Al_2O_3$ mol ratio than that of zeolites which have been conventionally used, and, when the harm-removing agent is subjected to a binderless treatment whereby the binder is converted to zeolite crystal, its adsorption is greatly enhanced to an extent such that cannot be expected from the decrease in amount of the binder.

The binderless treatment can be carried out by treating a zeolite molded body, made from a zeolite composition having incorporated therein a binder such as clay, with an alkali whereby the binder is converted to zeolite crystal. The zeolite crystal converted from the binder is preferably faujasite zeolite having a $SiO_2/Al_2O_3$ ratio of 2.0 to 2.3 in view of the adsorptive removal of a halogen-containing gas.

Though a preferable binder is not particularly limited provided that, when it is subjected to a binderless treatment, it gives faujasite zeolite having a $SiO_2/Al_2O_3$ ratio of 2.0 to 2.3 by mole, a preferable binder is selected from clay minerals. Among the clay minerals, kaolin clay is especially preferable because kaolin clay contains $SiO_2$ and $Al_2O_3$ at a $SiO_2/Al_2O_3$ ratio of 2.0 by mole, thus, it has a composition approximately similar to that of faujasite zeolite having a $SiO_2/Al_2O_3$ ratio of 2.0 to 2.3 by mole.

The conditions under which the binderless treatment is carried out, such as the concentration of alkali, the concentration of $SiO_2$, the temperature and the reaction time, are selected so that the binderless reaction can be conducted to the desired extent without substantial formation of impurities, and that the molded body has a sufficient mechanical strength and is not pulverized into a powder when it is used. For example, an alkali concentration of 0.5 to 10 mole/liter (especially, when the binder is converted to LSX zeolite, 6 to 10 mole/liter), a $SiO_2$ concentration of 0 to 1.5% by weight, a temperature of 70 to 95° C. and a reaction time of 3 to 10 hours can be mentioned as an example.

The method of rendering a halogen-containing gas harmless according to the present invention, using the above-mentioned harm-removing agent, will be described.

The method of rendering a halogen-containing gas harmless according to the present invention is similar to the conventional dry method of rendering a halogen-containing gas harmless, except that the above-mentioned harm-removing agent is used as the agent to be contacted with the halogen-containing gas. More specifically, the harm-removing agent according to the present invention is filled in a harm-removing column (an adsorption column) having an inlet of the halogen-containing gas at one end of the column and an outlet of the halogen-containing gas at the other end of the column, the halogen-containing gas is introduced through the inlet into the column where the gas is adsorbed by the harm-removing agent filled therein, and the halogen-containing gas removed to the desired low extent is withdrawn through the outlet.

The conditions for the adsorptive removal of the halogen-containing gas, such as the amount of harm-removing agent filled in the column, the shape and particle size of the harm-removing agent, the size of the harm-removing column, the flow rate (linear velocity) of the halogen-containing gas, the concentration of the halogen-containing gas, and the temperature and pressure for adsorptive removal of the halogen-containing gas, are appropriately chosen so that the efficiency of adsorptive removal of acceptable level can be achieved.

The shape of the harm-removing agent is usually spherical or cylindrical, preferably spherical. In the case of spherical shape, the harm-removing agent preferably has a diameter of 0.1 to 5 mm, and in the case of cylindrical shape, the harm-removing agent preferably has a diameter of 0.5 to 3 mm and a length of 1 to 10 mm. When the size of harm-removing agent is too small, the pressure drop in the adsorption column is undesirably large, the halogen-containing gas is difficult to pass through the column. In contrast, when the size of harm-removing agent is too large, the efficiency of adsorptive removal becomes very low.

The concentration of halogen-containing gas is adjusted preferably so as to be 0.1 to 10% by volume, and the linear velocity is preferably 0.01 to 10 m/sec. Heating or cooling of the adsorption column is not necessary, and the adsorptive removal can be effected at room temperature (20 to 30° C.). The adsorptive removal can be carried out at the atmospheric pressure.

The halogen-containing gas to be treated with the harm-removing agent of the present invention is not particularly limited provided that it contains halogen. Thus, the term "halogen-containing gas" broadly includes halogen gas as well as gaseous halogen-containing compounds. As specific examples of the halogen-containing gas, there can be mentioned halogens such as $F_2$, $Cl_2$, $Br_2$ and $I_2$; hydrogen halides such as HF, HCl, HBr and HI; silicon halides such as $SiF_4$, $SiCl_4$ and $SiBr_4$; boron halides such as $BCl_3$; tungsten halides such as $WF_6$ and $WCl_6$; carbonyl halides such as $COF_2$ and $COCl_2$; and oxygen halides such as $OF_2$. The harm-removing agent according to the present invention is preferably used for the adsorptive removal of halogens, more preferably for the adsorptive removal of $F_2$ gas or $Cl_2$ gas.

The harm-removing agent according to the present invention is used for rendering harmless a halogen-containing gas such as a halogen-containing exhaust gas. The halogen-containing exhaust gas includes those which contain halogens or halogen-containing compounds such as hydrogen halides, silicon halides, boron halides, tungsten halides, carbonyl halides and oxygen halides. The halogen-containing exhaust gas is drawn out from, for example, an etching step in the process of producing a semiconductor device or a liquid crystal device, a CVD (chemical vapor deposition) process, and a cleaning process. The harm-removing agent according to the present invention has a greatly enhanced capacity for adsorptive removal of the halogen-containing gas, as compared with the conventional harm-removing agents. Therefore, the frequency of exchange of the harm-removing agent in the adsorbing column can be minimized.

EXAMPLES

The invention will now be described specifically by the following and comparative examples that by no means limit the scope of the invention.

Example 1

A harm-removing agent for a halogen-containing gas was prepared from LSX zeolite (faujasite zeolite having a $SiO_2/Al_2O_3$ ratio of 2.0 by mole) as a zeolite powder. The LSX zeolite was synthesized as follows.

A reaction vessel was charged with 10,770 g of an aqueous sodium silicate solution ($Na_2O$ content: 3.8% by weight, $SiO_2$ content: 12.6% by weight), 1,330 g of water, 1,310 g of sodium hydroxide with a purity of 99%, and 3,630 of an aqueous solution of industrial potassium hydroxide with a purity of 48%. The content was maintained at 45° C. while being stirred at 100 rpm. To the content, there was added 5,390 g of an aqueous sodium aluminate solution ($Na_2O$ content: 20.0% by weight, $Al_2O_3$ content: 22.5% by weight) maintained at 40° C. An aqueous zeolite dispersion was prepared by dispersing 4.22 g of LSX powder in a small amount of water, and was added to the content in the reaction vessel. The thus-obtained slurry had a composition of $3.39Na_2O.1.31K_2O.1.90SiO_2.Al_2O_3.74.1H_2O$. The slurry was stirred at 100 rpm and aged at 45° C. for 1 hour. Thereafter, the temperature of the slurry was elevated to 70° C. over a period of 1 hour while being stirred. Then the stirring was stopped, and the slurry was maintained at 70° C. for 8 hours to conduct crystallization. The resultant crystal was filtered, washed with pure water, and dried at 70° C. overnight to give LSX zeolite.

The X ray diffraction analysis and chemical analysis of the LSX zeolite revealed that it was faujasite zeolite having a chemical composition of $0.72Na_2O.0.28K_2O.Al_2O_3.2.0SiO_2$.

100 parts by weight of the thus-obtained LSX zeolite was mixed together with 20 parts by weight of Sepiolite clay. The mixture was sufficiently kneaded while water was added. Thus a kneaded product comprising 65 parts by weight of water based on 100 parts by weight of the LSX zeolite was obtained. The kneaded product was granulated into spherical beads having a diameter in the range of 1.2 to 2.0 mm. The beads were dried at 100° C. overnight. The dried beads were calcined at 600° C. for 2 hours in an air stream. Then the beads was cooled in the air and humidified to a moisture content of 20 to 25%.

Then the LSX zeolite beads were subjected to ion exchange with Na cation and then washed with water. The beads was dried and then subjected to an activation treatment at 530° C. for 3 hours in a dry air stream. The dried beads were cooled in a manner such that they were not humidified to give a harm-removing agent of the present invention. The harm-removing agent had a $SiO_2/Al_2O_3$ mol ratio of 2.0, and contained 98% by mole of Na cation and 2% by mole of K cation based on the total cation content.

The harm-removing agent was evaluated for its capacity for rendering a halogen-containing gas harmless as follows.

A stainless steel column having an inner diameter of 28 mm, a height of 280 nm and an inner volume of 172 ml, and a gas inlet and a gas outlet at the lower end and the upper end, respectively, was used as a harm-removing column for rendering a halogen-containing gas harmless. The harm-removing column was vertically set, and filled with the harm-removing agent of this invention. As the halogen-containing gas, a gas containing 0.5% by volume of $Cl_2$-diluted with $N_2$, or a gas containing 0.5% by volume of HCl-diluted with $N_2$ was used. The halogen-removing test was carried out at a superficial linear velocity of 0.08 m/sec at 25° C. under the atmospheric pressure. The content of $Cl_2$ or HCl in the exhaust gas from the outlet at the upper end of the column was measured by an electrochemical sensor ("Polytron 7000" available from Draeger Safety Japan Co.). The period of time spanning from the initiation to the time at which the content of $Cl_2$ or HCl reached 1 ppm was measured as the breakthrough time, and the amount of $Cl_2$ or HCl, adsorbed during the breakthrough time, per unit weight of the harm-removing agent was measured as the breakthrough amount of adsorption. The results are shown in Table 1.

As seen from Table 1, the effect of removing $Cl_2$ or HCl by the faujasite zeolite is greatly large, which is unexpected from the change in the $SiO_2/Al_2O_3$ mol ratio (i.e., change from 2.5 to 2.0 [Comparative Example 1]).

Example 2

100 parts by weight of the LSX zeolite, synthesized in Example 1, was mixed together with 25 parts by weight of kaolin clay and 4 parts by weight of CMC (carboxymethyl cellulose). The mixture was sufficiently kneaded while water was added. Thus a kneaded product comprising 75 parts by weight of water based on 100 parts by weight of the LSX zeolite was obtained and further kneaded for 1 hour. The kneaded product was granulated into cylindrical bodies having a diameter of 1.5 mm and a length of 3 to 5 mm. The cylindrical bodies were dried at 200° C. The dried beads were calcined at 600° C. for 3 hours in a dry air stream, and then, cooled in the air and humidified to a moisture content of 20 to 25%.

The LSX zeolite cylindrical bodies were subjected to ion exchange with Na cation and then an activation treatment, by the same procedures as described in Example 1. The thus-obtained harm-removing agent contained 93% by mole of Na cation and 7% by mole of K cation, based on the total cation content.

The harm-removing agent was evaluated for its capacity for rendering a halogen-containing gas harmless by the same method as described in Example 1. The results are shown in Table 1.

Example 3

The kneaded LSX zeolite product, prepared by the same method as described in Example 2, was granulated into cylindrical bodies. The cylindrical bodies are filled in a column having an inner diameter of 108 mm and a height of 1,500 mm, where the bodies were subjected to a treatment for rendering binderless. This treatment was carried out by circulating 30 liters of a solution containing 2.2 mol/liter of NaOH and 1.0% by weight of $SiO_2$ through the column at 90° C. for 6 hours, whereby the binder was converted to faujasits zeolite. The faujasite zeolite was thoroughly washed with water as they were filled in the column.

The thus-prepared harm-removing agent had a $SiO_2/Al_2O_3$ mol ratio of 2.1, and contained 89% by mole of Na cation and 11% by mole of K cation based on the total cation content.

The harm-removing agent was subjected to activation treatment, and evaluated for its capacity for rendering a halogen-containing gas harmless by the same method as described in Example 1. The results are shown in Table 1.

As seen from Table 1, the effect of removing $Cl_2$ or HCl by the faujasite zeolite is greatly large, which is unexpected from the change in the $SiO_2/Al_2O_3$ mol ratio (i.e., change from 2.5 [Comparative Example 1] to 2.1).

Example 4

By the same procedures as described in Example 3, the LSX zeolite cylindrical bodies were subjected to a treatment for rendering binderless. Further, the LSX zeolite cylindrical bodies were subjected to an ion exchange with Na cation and an activation treatment and thereafter evaluated for its capacity for rendering a halogen-containing gas harmless by the same method as described in Example 1. The Na cation-exchanged zeolite bodies had a $SiO_2/Al_2O_3$ mol ratio of 2.1, and contained 99% by mole of Na cation and 1% by mole of K cation based on the total cation content. The evaluation results are shown in Table 1.

Comparative Example 1

Using a F-9 zeolite powder (faujasite zeolite having a $SiO_2/Al_2O_3$ ratio of 2.5 by mole, and containing Na cation as the cation; available from Tosoh Corporation) as a zeolite powder, a harm-removing agent was made by conducting molding into cylindrical bodies, a calcinations treatment and a binderless treatment by the same procedures as described in Example 3.

The harm-removing agent was evaluated for its capacity for rendering a halogen-containing gas harmless by the same method as described in Example 1. The results are shown in Table 1.

Comparative Example 2

Using a F-9 zeolite powder (faujasite zeolite having a $SiO_2/Al_2O_3$ ratio of 2.5 by mole, and containing Na cation as the cation; available from Tosoh Corporation) as a zeolite powder, a harm-removing agent was made by conducting the same procedures as described in Example 2. Binderless treatment was not carried out.

The harm-removing agent was evaluated for its capacity for rendering a halogen-containing gas harmless by the same method as described in Example 1. The results are shown in Table 1.

Comparative Example 3

Using an A-4 zeolite powder (A-type zeolite having a $SiO_2/Al_2O_3$ ratio of 2.0 by mole; available from Tosoh Corporation) as a zeolite powder, a harm-removing agent was made. That is, 100 parts by weight of the A-4 zeolite powder was mixed together with 25 parts by weight of kaolin clay and 4 parts by weight of CMC (carboxymethyl cellulose). The mixture was sufficiently kneaded while water was added. Thus a kneaded product comprising 70 parts by weight of water based on 100 parts by weight of the A-4 zeolite powder was obtained and further kneaded for 1 hour. The kneaded product was granulated into cylindrical bodies having a diameter of 1.5 mm and a length of 3 to 5 mm. The cylindrical bodies were dried at 200° C. The dried beads were calcined at 600° C. for 3 hours in a dry air stream, and then, cooled in the air and humidified to a moisture content of 20 to 25%.

The cylindrical bodies are filled in a column having an inner diameter of 108 mm and a height of 1,500 nm, where the bodies were subjected to a treatment for rendering binderless. This treatment was carried out by circulating 30 liters of a solution containing 1.6 mol/liter of NaOH through the column at 80° C. for 6 hours, whereby the zeolite was converted to A-type zeolite. The A-type zeolite bodies were thoroughly washed with water as they were filled in the column.

Then the A-type zeolite bodies were subjected to a Ca cation-exchange treatment by circulating an aqueous $CaCl_2$ solution having a concentration of 1 mol/liter through the column at 80° C. After completion of the Ca cation-exchange, the zeolite bodies were thoroughly washed with water as they were filled in the column. The zeolite bodies contained 90% by mole of Ca cation and 10% by mole of Na cation based on the total cation. Then the bodies were taken from the column, and dried at 70° C. for 16 hours. Thereafter, the dried bodies were subjected to an activation treatment at 530° C. for 3 hours under a dry air stream using a tubular furnace (available from Advantech Co.).

The dried beads were cooled in a manner such that they were not humidified to give a harm-removing agent. The harm-removing agent had a $SiO_2/Al_2O_3$ mol ratio of 2.0.

The harm-removing agent was evaluated for its capacity for rendering a halogen-containing gas harmless by the same method as described in Example 1. The results are shown in Table 1.

Comparative Example 4

Using a HSZ-320NAA zeolite powder (faujasite zeolite having a $SiO_2/Al_2O_3$ ratio of 5.5 by mole; available from Tosoh Corporation) as a zeolite powder, a harm-removing agent was made by conducting the same procedures as described in Example 3 with all other procedures and conditions remaining the same. The harm-removing agent had a $SiO_2/Al_2O_3$ mol ratio of 5.0 and contained only Na cation as the cation.

The harm-removing agent was evaluated for its capacity for rendering a halogen-containing gas harmless by the same method as described in Example 1. The results are shown in Table 1.

TABLE 1

| Working Examples | Type of zeolite | Ratio of $SiO_2/Al_2O_3$ by mol | Shape of molded body | Binder-less treatment | Content of cation (mol %) Na | Content of cation (mol %) K | Adsorption of $Cl_2$ Breakthrogh amount (mol/kg) | Adsorption of $Cl_2$ Breakthrogh time (min) | Adsorption of HCl Breakthrogh amount (mol/kg) | Adsorption of HCl Breakthrogh time (min) |
|---|---|---|---|---|---|---|---|---|---|---|
| Example 1 | Faujasite | 2.0 | Spherical | No | 98 | 2 | 1.52 | 255.9 | 3.71 | 509 |
| Example 2 | Faujasite | 2.0 | Cylindrical | No | 93 | 7 | 0.98 | 162.0 | 2.86 | 446 |
| Example 3 | Faujasite | 2.1 | Cylindrical | Yes | 89 | 11 | 1.54 | 257.4 | 3.33 | 534 |
| Example 4 | Faujasite | 2.1 | Cylindrical | Yes | 99 | 1 | 1.53 | 257.0 | 3.53 | 559 |
| Co. Ex. 1 | Faujasite | 2.5 | Cylindrical | Yes | 100 | — | 0.86 | 138.4 | 3.16 | 483 |
| Co. Ex. 2 | Faujasite | 2.5 | Cylindrical | No | 100 | — | 0.55 | 89.6 | 2.68 | 407 |
| Co. Ex. 3 | A | 2.0 | Cylindrical | Yes | 10 | Ca 90 | 0.20 | 32.0 | 2.99 | 457 |
| Co. Ex. 4 | Faujasite | 5.0 | Cylindrical | Yes | 100 | — | 0.04 | 4.8 | 2.05 | 268 |

Evaluation of Adsorption Selectivity and Equilibrium Adsorption

Equilibrium adsorption of $Cl_2$ and $CO_2$ at 4 mmHg and 760 mg was evaluated on Na-LSX ($SiO_2/Al_2O_3$ mol ratio: 2.1) used in Example 4 and Na—X ($SiO_2/Al_2O_3$ mol ratio: 2.5) used in Comparative Example 1. Further, adsorption selectivity (ratio of adsorptions: $Cl_2/N_2$ and $CO_2/N_2$) on the same Na-LSX and Na—X. The evaluation results are shown in Table 2.

TABLE 2

| Adsorbent | $SiO_2/Al_2O_3$ mol ratio | Adsorption selectivity (-) $Cl_2/N_2$ | Adsorption selectivity (-) $CO_2/N_2$ | Equlibrium adsorption (Nml/g) $Cl_2$ | Equlibrium adsorption (Nml/g) $CO_2$ | Equlibrium adsorption (Nml/g) $N_2$ |
|---|---|---|---|---|---|---|
| Na-LSX | 2.1 | 5.16 | 4.65 | 49.7 | 44.8 | 9.6 |
| Na-X | 2.5 | 3.06 | 3.72 | 30.2 | 36.7 | 9.9 |

As seen from Table 2, Na-LSX zeolite having a $SiO_2/Al_2O_3$ ratio of 2.1 by mole exhibits a selectivity to $CO_2/N_2$ of 4.65, which is about 1.25 times of the selectivity to $CO_2/N_2$ (3.72) of X-type zeolite having a $SiO_2/Al_2O_3$ ratio of 2.5 by mole. In contrast, Na-LSX zeolite having a $SiO_2/Al_2O_3$ ratio of 2.1 by mole exhibits a selectivity to $Cl_2/N_2$ of 5.16, which is about 1.68 times of the selectivity to $CO_2/N_2$ (3.06) of X-type zeolite having a $SiO_2/Al_2O_3$ ratio of 2.5 by mole. This means that the Na-LSX zeolite exhibits a greatly enhanced adsorption for a halogen-containing gas. This adsorption of the Na-LSX zeolite for a halogen-containing gas is very specific and quite different from the adsorption thereof for other gases.

What is claimed is:

1. A method of rendering a halogen-containing gas harmless, which comprises contacting a halogen-containing gas having a concentration of halogen or a halogen-containing compound in the range of 0.1 to 10% by volume at a temperature in the range of 20 to 30° C. with an agent comprising a faujasite zeolite having a $SiO_2/Al_2O_3$ ratio in the range of 2.0 to 2.1 and containing at least one cation selected from the group consisting of Na cation, K cation, and alkaline earth metal cations.

2. The method according to claim 1, wherein said agent is a molded body further comprising a clay in an amount of not larger than 10% by weight based on the molded body.

3. The method according to claim 1, wherein said at least one cation comprises at least 70% by mole of Na and not larger than 30% by mole of K.

4. The method according to claim 1, wherein said agent is a molded body prepared by molding a mixture of said faujasite with a clay, and then rendering the clay binderless to convert the clay to a zeolite.

5. The method according to claim 1, wherein the halogen-containing gas is a halogen-containing exhaust gas from an etching step in a process of producing a semiconductor device or a liquid crystal device, a chemical vapor deposition process or a cleaning process.

6. The method according to claim 1, wherein said at least one cation comprises between 89% and 99% by mole of Na and between 1% and 11% by mole of K.

* * * * *